July 29, 1958
R. J. A. TEICHEIRE
2,845,518
ELECTRIC SOLDERING IRONS
Filed March 12, 1956
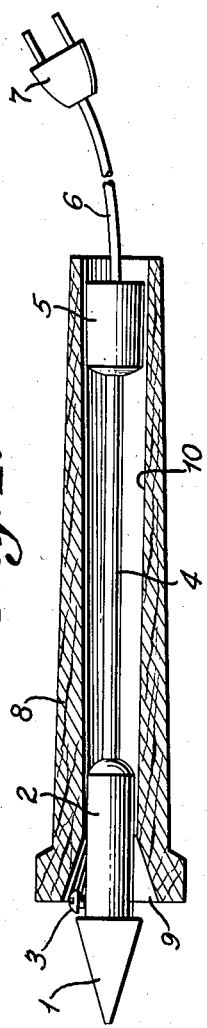
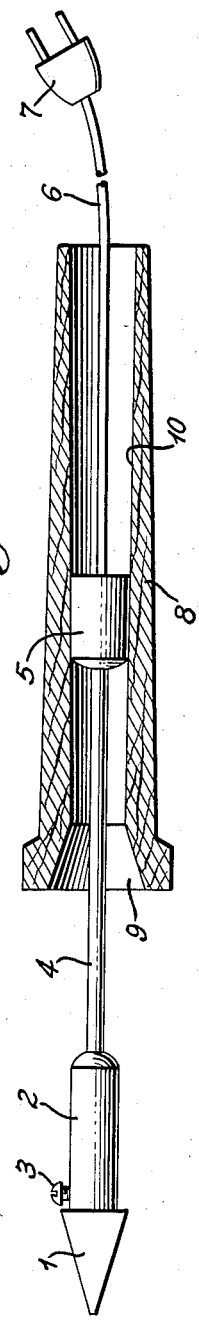
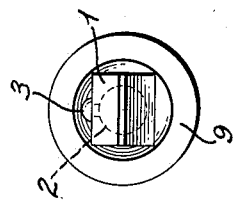
INVENTOR
Rene Jean Antoine Teicheire
BY
Stevens, Davis, Miller & Mosher
ATTORNEYS

United States Patent Office 2,845,518
Patented July 29, 1958

2,845,518
ELECTRIC SOLDERING IRONS
René Jean Antoine Teicheire, Rio de Janeiro, Brazil Application March 12, 1956, Serial No. 570,790

Claims priority, application Brazil March 17, 1955

2 Claims. (Cl. 219—26)

The present invention refers to the well-known electric soldering irons and is designed to permit the construction of a soldering iron capable of insertion within its own handle, in order to render easier the transportation of said tool in the technician's or workman's pocket when he has to carry out small repairs in a home, as so often happens with radio and television technicians.

It is a well-known fact that electric soldering irons must have their heated points at an appreciable distance from the handle, firstly for the operator's greater convenience and secondly in order to avoid, as much as possible, the transmission of heat, by conductivity or thermal radiation, from the hot point to the handle and the operator's hand.

Because of this, ordinary electric irons have had to have fairly long lengths, very seldom less than 12 in., and this makes their transportation a difficult and troublesome problem.

As already stated above, the improvements provided by the present invention are meant to eliminate said drawback since they will permit the easy telescopical engagement of the iron's stem within a hollow handle, in order to shorten the instrument for the sake of ease of transportation, without detriment to the equally easy projection of the iron into its normal operating position, as explained below in the description designed to illustrate the novel and improved soldering iron exemplified in the attached drawing, wherein:

Fig. 1 illustrates a longitudinal section through the novel improved soldering iron, with same in its retracted or transport position;

Fig. 2 illustrates a similar section of same in its projected or operating position; and, Fig. 3 is an end elevation of said soldering iron.

As shown in the drawing, the novel improved soldering iron has a conventional copper point 1 surrounded by a metal casing 2 wherein lies the conventional generally cylindrical resistance element which is mounted in the parallel perforations of a cylindrical ceramic body tightly inserted within said casing 2 and which is therefore not shown in the drawing. Said casing 2 is held unitary with an internal cylindrical projection of said point 1 by means of a set screw 3.

From the back part of casing 2 there projects as usual a tubular metal stem 4, preferably made of stainless steel, through which pass the leads or wires which supply current to the resistance, said wires—which lie within a second metal casing 5 unitary with said tubular stem 4—being conveniently connected to the ends of a flexible cable 6 which has at its opposite free end an electric plug 7.

The handle of the instrument, preferably made of wood, Bakelite or some such insulating material, 8, is a round rather long tubular body having an enlarged end shaped like a dome or bell 9.

The internal perforation or axial bore 10 of handle 8 is not perfectly cylindrical, but, indeed, slightly conical, with a taper of approximately ½ to 1½°, the final diameter on the side of bell mouth 9 being slightly less than the diameter of the free point, situated to the right in Figs. 1 and 2 of the drawing.

The diameter of casing 2 is such as to permit same to pass with a very small play along the whole axial perforation or base of handle 8, thereby allowing the soldering iron, with its point 1, to be inserted from right to left in said handle or grip 8; however, after placing of set screw 3 in position, said point will no longer be capable of retracting within said handle 8.

However casing 5, although substantially cylindrical in shape, may and should indeed have a very slight taper—such as ½ to 1°—in the opposite sense to that of perforation 10 and, since it has a diameter slightly larger than that of casing 2, it cannot issue from the dome-shaped end 9, since at a certain point along the length of the latter it will grip against the inner wall or bore of handle 8, as shown in Fig. 2, thus retaining the soldering iron in its normal operating position.

In order to retract the iron to its rest and transport position, the operator will obviously merely have to exert a slight axial pressure on the end of point 1.

As will be seen from the above description, I have managed to devise a soldering iron which may be easily shortened for transportation purposes, said iron being further devoid of separate screw-threaded parts which may get lost, and wherein the handle 8—in the operating position of the iron—is well protected from the heat issuing from point 1, thaanks to the appreciable length of stem 4, to the small contact between casing 5 and said handle 8 and to the circulation of air through the interior of bell-shaped mouth 9.

The subject of the present invention, herein exemplified, may obviously be modified as regards constructional details, all within the scope of the attached claims.

I claim:

1. A soldering iron comprising an elongated handle having opposing ends and having an axial bore extending therethrough and through the ends, said bore having uninterrupted, plain walls which taper from one end to the other end, and a soldering member including a stem portion having a bit on one end, said stem portion being slidably disposed in the bore and having an enlarged section disposed within the bore and being of a cross-sectional size greater than the internal size of the bore at the other end so that said enlarged section frictionally fits within the bore at the other end of the handle to lock the bit in a position extending from said end of the handle.

2. A soldering iron comprising an elongated handle having opposing ends and having an axial bore extending therethrough and through the ends, said bore having uninterrupted, plain walls which taper from one end to the other end, and a soldering member including a stem portion having a bit on one end, said stem portion being slidably disposed in the bore and having an enlarged section disposed within the bore and being of a cross-sectional size greater than the internal size of the bore at the other end so that said enlarged section frictionally fits within the bore at the other end of the handle to lock the bit in a position extending from said end of the handle, said enlarged section being formed on the other end of the stem portion.

References Cited in the file of this patent

UNITED STATES PATENTS

| 662,748 | Wood | Nov. 27, 1900 |
| 1,447,730 | Post | Mar. 6, 1923 |
| 2,056,951 | Bohall et al. | Oct. 13, 1936 |
| 2,779,991 | Bolick | Feb. 5, 1957 |

FOREIGN PATENTS

| 589,892 | Great Britain | July 2, 1947 |